(12) United States Patent
Lameer et al.

(10) Patent No.: US 9,357,127 B2
(45) Date of Patent: May 31, 2016

(54) SYSTEM FOR AUTO-HDR CAPTURE DECISION MAKING

(71) Applicant: GOOGLE TECHNOLOGY HOLDINGS LLC, Mountain View, CA (US)

(72) Inventors: Lorne J. Lameer, Burlington, WI (US); Daniel M. Bloom, Loveland, CO (US); By-Her W. Richards, Lincolnshire, IL (US); Elena Satraitis, Chicago, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 66 days.

(21) Appl. No.: 14/218,194

(22) Filed: Mar. 18, 2014

(65) Prior Publication Data

US 2015/0271405 A1 Sep. 24, 2015

(51) Int. Cl.
  *H04N 9/73* (2006.01)
  *H04N 5/232* (2006.01)
  *H04N 5/235* (2006.01)
  *H04N 9/09* (2006.01)

(52) U.S. Cl.
  CPC ......... *H04N 5/23245* (2013.01); *H04N 5/2353* (2013.01); *H04N 5/2355* (2013.01); *H04N 5/2356* (2013.01); *H04N 5/23222* (2013.01); *H04N 5/23293* (2013.01); *H04N 9/09* (2013.01); *H04N 2209/042* (2013.01)

(58) Field of Classification Search
  CPC ............ H04N 5/23245; H04N 5/2353; H04N 5/23222; H04N 5/2355; H04N 5/23293; H04N 5/2356; H04N 9/09; H04N 2209/042
  USPC ................... 348/153–155, 223.1–229.1, 362
  See application file for complete search history.

(56) References Cited

U.S. PATENT DOCUMENTS

| 4,881,127 A | 11/1989 | Isoguchi et al. |
| 5,294,990 A | 3/1994 | Aoki et al. |
| 5,505,199 A | 4/1996 | Kim |
| 5,909,246 A | 6/1999 | Terashima |
| 6,167,356 A | 12/2000 | Squadron et al. |

(Continued)

FOREIGN PATENT DOCUMENTS

| EP | 2043360 A2 | 4/2009 |
| EP | 2645700 | 3/2012 |

(Continued)

OTHER PUBLICATIONS

European Patent Office, International Search Report and the Written Opinion in International Patent Application PCT/US2015/018869 (May 20, 2015).

(Continued)

*Primary Examiner* — Yogesh Aggarwal
(74) *Attorney, Agent, or Firm* — Wolfe-SBMC

(57) ABSTRACT

A method and apparatus for invoking a High Dynamic Range ("HDR") mode in a camera are disclosed. The method comprises detecting that the camera is operating in a preview mode. The method further comprises determining a dynamic range, Auto Exposure ("AE") metadata, and a motion level associated with a plurality of frames captured in the preview mode. Finally, the method comprises invoking the HDR mode when each of the determined dynamic range, the AE metadata, and the motion level is above a first threshold value, a second threshold value, and a third threshold value, respectively.

16 Claims, 3 Drawing Sheets

(56) References Cited

U.S. PATENT DOCUMENTS

| | | | |
|---|---|---|---|
| 6,347,925 B1 | 2/2002 | Woodard et al. | |
| 6,529,253 B1 | 3/2003 | Matsute | |
| 6,614,471 B1 | 9/2003 | Ott | |
| 7,190,263 B2 | 3/2007 | McKay et al. | |
| 7,301,563 B1* | 11/2007 | Kakinuma | H04N 5/144 348/155 |
| 7,414,665 B2 | 8/2008 | Watanabe et al. | |
| 7,450,187 B2 | 11/2008 | Sun | |
| 8,295,631 B2 | 10/2012 | Adams et al. | |
| 8,619,128 B2 | 12/2013 | Bilbrey et al. | |
| 8,803,985 B2 | 8/2014 | Kaizu et al. | |
| 9,143,749 B2 | 9/2015 | Wernersson | |
| 2002/0080263 A1 | 6/2002 | Krymski | |
| 2003/0007088 A1 | 1/2003 | Rantanen et al. | |
| 2003/0052989 A1 | 3/2003 | Bean et al. | |
| 2004/0107103 A1 | 6/2004 | Iyengar et al. | |
| 2005/0154318 A1 | 7/2005 | Sato | |
| 2005/0206820 A1 | 9/2005 | Palmer | |
| 2006/0156374 A1 | 7/2006 | Hu et al. | |
| 2007/0090283 A1 | 4/2007 | Linke et al. | |
| 2007/0115459 A1 | 5/2007 | Nakao et al. | |
| 2007/0201815 A1 | 8/2007 | Griffin | |
| 2007/0237423 A1 | 10/2007 | Tico et al. | |
| 2008/0077020 A1 | 3/2008 | Young et al. | |
| 2009/0086074 A1 | 4/2009 | Li et al. | |
| 2009/0087099 A1 | 4/2009 | Nakamura | |
| 2009/0109309 A1 | 4/2009 | He et al. | |
| 2009/0189992 A1 | 7/2009 | Zhang et al. | |
| 2009/0190803 A1 | 7/2009 | Neghina et al. | |
| 2010/0091119 A1 | 4/2010 | Lee | |
| 2010/0097491 A1 | 4/2010 | Farina et al. | |
| 2010/0149393 A1 | 6/2010 | Zarnowski et al. | |
| 2010/0208082 A1 | 8/2010 | Buchner et al. | |
| 2010/0271469 A1 | 10/2010 | She | |
| 2010/0309333 A1 | 12/2010 | Smith et al. | |
| 2010/0309334 A1 | 12/2010 | James et al. | |
| 2010/0309335 A1 | 12/2010 | Brunner et al. | |
| 2011/0013807 A1 | 1/2011 | Lee et al. | |
| 2011/0043691 A1 | 2/2011 | Guitteny et al. | |
| 2011/0052136 A1 | 3/2011 | Homan et al. | |
| 2011/0069189 A1 | 3/2011 | Venkataraman et al. | |
| 2011/0122315 A1 | 5/2011 | Schweiger et al. | |
| 2011/0205433 A1 | 8/2011 | Altmann et al. | |
| 2012/0081579 A1* | 4/2012 | Doepke | H04N 5/2355 348/231.99 |
| 2012/0105584 A1 | 5/2012 | Gallagher et al. | |
| 2012/0314901 A1 | 12/2012 | Hanson et al. | |
| 2013/0016251 A1 | 1/2013 | Ogasahara | |
| 2013/0057713 A1 | 3/2013 | Khawand | |
| 2013/0208138 A1 | 8/2013 | Li et al. | |
| 2013/0208143 A1 | 8/2013 | Chou et al. | |
| 2013/0271602 A1 | 10/2013 | Bentley et al. | |
| 2013/0314511 A1 | 11/2013 | Chen et al. | |
| 2014/0009634 A1 | 1/2014 | Hiwada et al. | |
| 2014/0063300 A1 | 3/2014 | Lin et al. | |
| 2014/0074265 A1 | 3/2014 | Arginsky et al. | |
| 2014/0085495 A1 | 3/2014 | Almalki et al. | |
| 2014/0160326 A1 | 6/2014 | Black | |
| 2014/0232929 A1* | 8/2014 | Ichikawa | H04N 5/2355 348/362 |
| 2014/0244617 A1 | 8/2014 | Rose | |
| 2014/0358473 A1 | 12/2014 | Goel et al. | |
| 2015/0195482 A1 | 7/2015 | Wise | |
| 2015/0288869 A1 | 10/2015 | Furuhashi | |
| 2015/0341546 A1 | 11/2015 | Petrescu et al. | |
| 2015/0341547 A1 | 11/2015 | Petrescu et al. | |
| 2015/0341548 A1 | 11/2015 | Petrescu et al. | |
| 2015/0341549 A1 | 11/2015 | Petrescu et al. | |
| 2015/0341550 A1 | 11/2015 | Lay | |
| 2015/0341561 A1 | 11/2015 | Petrescu et al. | |
| 2016/0037055 A1 | 2/2016 | Waddington | |
| 2016/0050354 A1 | 2/2016 | Musatenko et al. | |
| 2016/0080626 A1 | 3/2016 | Kovtun et al. | |

FOREIGN PATENT DOCUMENTS

| | | |
|---|---|---|
| EP | 2852147 | 3/2015 |
| KR | 20070005947 | 1/2007 |
| WO | WO 2005099251 | 10/2005 |
| WO | WO 2007128114 | 11/2007 |
| WO | WO 2010068175 | 6/2010 |
| WO | WO 2012166044 | 12/2012 |
| WO | WO 2013172335 | 11/2013 |

OTHER PUBLICATIONS

"Advisory Action", U.S. Appl. No. 11/931,828, May 30, 2014, 3 pages.

"Final Office Action", U.S. Appl. No. 11/931,828, Jan. 14, 2014, 14 pages.

"Final Office Action", U.S. Appl. No. 11/931,828, May 13, 2010, 17 pages.

"Final Office Action", U.S. Appl. No. 11/931,828, Jun. 11, 2015, 16 pages.

"Final Office Action", U.S. Appl. No. 13/468,098, Sep. 18, 2015, 16 pages.

"International Preliminary Report on Patentability", Application No. PCT/US2013/040347, Nov. 20, 2014, 6 pages.

"International Search Report and Written Opinion", Application No. PCT/US2013/040437, Jul. 23, 2013, 9 pages.

"International Search Report and Written Opinion", Application No. PCT/US2015/023238, Jun. 22, 2015, 11 pages.

"International Search Report and Written Opinion", Application No. PCT/US2015/023250, Jun. 22, 2015, 12 pages.

"International Search Report and Written Opinion", Application No. PCT/US2015/023241, Jun. 23, 2015, 12 pages.

"New BLINK Apps Even More Creative", Retrieved from: http://research.microsoft.com/en-us/news/features/blink-061813.aspx, Jun. 18, 2013, 4 pages.

"Non-Final Office Action", U.S. Appl. No. 11/931,828, Jul. 12, 2013, 21 pages.

"Non-Final Office Action", U.S. Appl. No. 11/931,828, Oct. 7, 2015, 22 pages.

"Non-Final Office Action", U.S. Appl. No. 11/931,828, Nov. 19, 2014, 20 pages.

"Non-Final Office Action", U.S. Appl. No. 11/931,828, Dec. 30, 2009, 14 pages.

"Non-Final Office Action", U.S. Appl. No. 13/468,098, Mar. 2, 2015, 14 pages.

"Non-Final Office Action", U.S. Appl. No. 14/448,199, Sep. 17, 2015, 14 pages.

"Non-Final Office Action", U.S. Appl. No. 14/450,573, Dec. 23, 2015, 10 pages.

"Non-Final Office Action", U.S. Appl. No. 14/457,374, Nov. 13, 2015, 12 pages.

"Non-Final Office Action", U.S. Appl. No. 14/487,785, Sep. 25, 2015, 8 pages.

"Powershot SX700HS Camera User Guide", Retrieved from the Internet: http://gdlp01.c-wss.com/gds/7/0300014407/02/PowerShot_SX700HS_Camer_User_Guide_EN.pdf, Mar. 29, 2014, 196 pages.

"Restriction Requirement", U.S. Appl. No. 14/450,390, Dec. 16, 2015, 6 pages.

"Restriction Requirement", U.S. Appl. No. 14/450,522, Dec. 24, 2015, 6 pages.

"Restriction Requirement", U.S. Appl. No. 14/450,553, Jan. 7, 2016, 6 pages.

"Restriction Requirement", U.S. Appl. No. 14/450,573, Sep. 1, 2015, 6 pages.

Dexter, "Multi-view Synchronization of Human Actions and Dynamic Scenes", In Proceedings British Machine Vision Conference, 2009, 11 pages.

Whitehead, "Temporal Synchronization of Video Sequences in Theory and in Practice", Proceedings of the IEEE Workshop on Motion Video Computing, 2005, 6 pages.

Non-Final Office Action, U.S. Appl. No. 14/450,390, Apr. 8, 2016, 10 pages.

(56) References Cited

OTHER PUBLICATIONS

Notice of Allowance, U.S. Appl. No. 13/468,098, Mar. 23, 2016, 8 pages.
Notice of Allowance, U.S. Appl. No. 14/448,199, Apr. 5, 2016, 10 pages.
Notice of Allowance, U.S. Appl. No. 14/457,374, Feb. 10, 2016, 15 pages.
Notice of Allowance, U.S. Appl. No. 14/487,785, Feb. 1, 2016, 9 pages.
Restriction Requirement, U.S. Appl. No. 14/450,461, Jan. 20, 2016, 6 pages.

* cited by examiner

SYSTEM FOR AUTO-HDR CAPTURE DECISION MAKING

TECHNICAL FIELD

The present disclosure is related generally to auto High Dynamic Range ("HDR") capture decision making and more particularly to a system and method for automatically capturing an HDR image.

BACKGROUND

There are a number of cameras which exist today that possess built-in HDR functionality. Such cameras generally include an Auto Exposure Bracketing ("AEB") option. When the HDR mode is selected, the AEB option is invoked and the camera automatically takes three or more shots with a different exposure for each frame. AEB is a useful option for taking HDR scenes. Thus, when the HDR mode is selected, the AEB option is invoked, and the camera takes multiple shots which are later combined using various techniques to get a final image. However, in such a scenario, the user has to always manually enable the HDR mode or disable the HDR mode depending on the various conditions. The user may or may not be able to decide appropriately. Consequently, this might not result in the best shot of an image to be captured.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Figure 1:
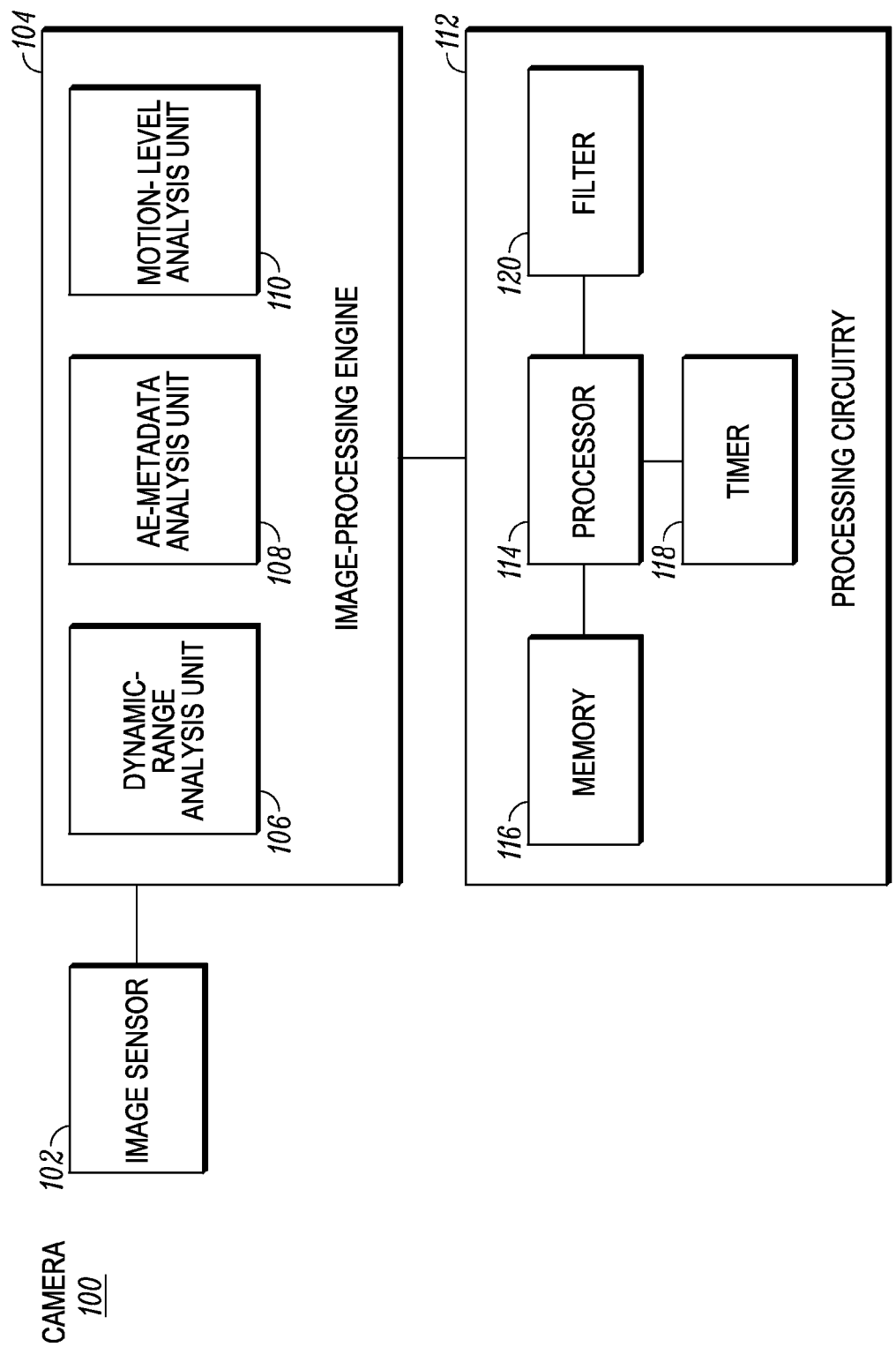
FIG. 1 is a block diagram of a camera device in accordance with some embodiments of the present invention.

Turning to the drawings, wherein like reference numerals refer to like elements, techniques of the present disclosure are illustrated as being implemented in a suitable environment. The following description is based on embodiments of the claims and should not be taken as limiting the claims with regard to alternative embodiments that are not explicitly described herein.

Before providing a detailed discussion of the figures, a brief overview is given to guide the reader. Generally, HDR is defined as a set of techniques used in imaging and photography to reproduce a greater dynamic range of luminosity than possible using standard digital imaging or photographic techniques. HDR images can represent more accurately the range of intensity levels found in real scenes and are often captured by way of a plurality of differently exposed pictures of the same subject matter. The differently exposed pictures of the same subject matter are then combined to produce the final image. However, with the existing technologies, a user has to manually enable the HDR mode for a particular scene to be captured depending on various factors. This does not always provide the best possible shot for the scene to be captured.

The present techniques provide a method and apparatus for automatically invoking the HDR mode in a camera. The user simply uses his camera, and the camera assists him in taking the best shot for the scene. The automatic capturing of the HDR image eases the user's experience. The detection of various signals and decision making based on those signals is made at the time the camera is operating in a preview or a viewfinder mode.

Briefly, in a specific embodiment, when the camera detects that the camera is in a preview mode, the camera determines a dynamic range, auto-exposure ("AE") metadata, and a motion level associated with frames captured in the preview mode. Further, the camera invokes the HDR mode based on the determined values of the dynamic range, AE metadata, and the motion level.

More generally, methods and apparatuses for invoking an HDR in a camera are disclosed. The method comprises detecting that the camera is operating in a preview mode. The method further comprises determining a dynamic range, AE metadata, and a motion level associated with a plurality of frames captured in the preview mode. Finally, the method comprises invoking the HDR mode when each of the determined dynamic range, the AE metadata, and the motion level is above a first threshold value, a second threshold value, and a third threshold value, respectively.

Turning now to the drawings, one example of the present system is described in detail, although any suitable examples may be employed. A block diagram of a camera 100 that captures images is illustrated in FIG. 1. The camera 100 may be a stand-alone device or may be incorporated into a portable electronic device such as a cellular telephone, a laptop, etc. The camera 100 includes an image sensor 102, an image-processing engine 104, and processing circuitry 112. The image-processing engine 104 includes a dynamic-range analysis unit 106, AE-metadata analysis unit 108, a motion-level analysis unit 110. The processing circuitry 112 includes a processor 114, a memory 116, a timer 118, and a filter 120.

The image sensor 102 captures an image. Specifically, during the image-capture operations, light from a scene may be focused onto the image sensor 102. During a preview or a viewfinder mode, the image sensor 102 captures the image, converts into an electrical signal, and provides it to the image-processing engine 104. It may be understood by one skilled in art that various types of image sensors 102 may be used in the camera 100.

The camera 100 further comprises the image-processing engine 104. The image-processing engine 104 receives the electrical signal from the image sensor 102 and processes the signal to detect various parameters. Specifically, the image-processing engine 104 comprises the dynamic-range analysis unit 106, the AE-metadata analysis unit 108, and the motion-level analysis unit 110. The dynamic-range analysis unit 106 on receiving the electrical signal determines a dynamic range of a plurality of frames associated with the image for a particular scene. The dynamic range may be defined as the luminance ratio of the brightest element in a given scene to the darkest element in the given scene. Typically, cameras and other imaging devices capture images having a dynamic range that is smaller than that of real-world scenes.

Further, during the image-sensor operations, the dynamic range of the scene to be captured may vary. For example, the dynamic range of a scene that is imaged may change as the image-sensor 102 is pointed in different directions, as the lighting conditions of the scene change, etc. The dynamic range determined by the dynamic-range analysis unit 106 indicates if the scene has a need to improve the dynamic range or has a need to bring out details in dark or shadow regions or bring out details in bright regions. This is one of the factors in determining whether the HDR mode should be invoked or not.

Further, the AE-metadata analysis unit 108 determines a delta between current scene AE-tone characteristics, based on raw-image statistics, and the target AE-tone characteristics, producing AE metadata indicating bi-modal strength of a scene, how much the image or parts of the image should be pushed down for tone mapping, how much saturation should be applied to the color space, and the tone map steepness of the scene. Therefore, the AE-metadata analysis unit 108 determines the AE metadata for the frames associated with the image in the preview mode.

Furthermore, the motion-level analysis unit 110 detects motion associated with the plurality of frames within the scene in the preview mode, allowing the motion-level analysis unit 110 to determine if the subject or the entire scene motion will result in a poor capture. Based on this determination, the motion-level analysis unit 110 determines the motion level associated with the frames associated with the image in the preview mode. In accordance with an embodiment, the motion-level analysis unit 110 may comprise a motion sensor, for example, an accelerometer, a gyroscope, or the like for detecting the motion.

Further, three signals comprising the dynamic range, the AE metadata, and the motion level are provided to the processing circuitry 112. In accordance with an embodiment, the filter 120 in the processing circuitry 112 receives the three signals and filters them to protect them from oscillation. The filter 120 may be a temporal hysteresis filter. In accordance with an embodiment, the filter 120 tracks the dynamic range, the AE metadata, and the motion level for a specified time period. The specified time period may be dynamically determined by the processor 114. The filter 120 determines a stability value of the dynamic range, the AE metadata, and the motion level for the plurality of frames captured in the specified time period. The stability value predicts a future stability of the measured dynamic range, the AE metadata, and the motion level. In an embodiment, the filter 120 predicts the future stability of the dynamic range, the AE metadata, and the motion level of the scene based on historical scene motion, historical dynamic range, and historical AE statistics evaluated for the specified time period.

In accordance with an embodiment, the filtered data from the filter 120 are provided to the processor 114 in the processing circuitry 112. In another embodiment, the processor 114 constantly receives three signals, comprising the dynamic range, the AE metadata, and the motion level, from the image-processing engine 104 as the preview frames are processed, and then the signals are filtered by the filter 120.

In addition, the processor 114 in the processing circuitry 112 may include one or more integrated circuits (e.g., image-processing circuits, microprocessors, storage devices such as random-access memory and non-volatile memory, etc.) and may be implemented using components that are separate from the processing circuitry 112 or that form part of the processing circuitry 112 (e.g., circuits that form part of an integrated circuit that controls or reads pixel signals from image pixels in an image pixel array on image-processing engine 104 or an integrated circuit within the processing circuitry 112). Image data that have been captured by the image sensor 102 may be processed by the processor 114 and stored in the memory 116. Processed image data may, if desired, be provided to external equipment (e.g., a computer or other device) using wired or wireless communications paths coupled to the image-processing engine 104.

Further, the processing circuitry 112 automatically invokes the HDR mode based on the three input values received from each of the dynamic-range analysis unit 106, the AE-metadata analysis unit 108, and the motion-level analysis unit 110 in the image-processing engine 104. Specifically, when each of the dynamic range, AE metadata, and the motion level is greater than a first threshold value, a second threshold value, and a third threshold value, the HDR mode is invoked. The values of the first, second, and the third threshold may be set by the manufacturer of the camera.

The processor 114 is further coupled to the memory 116 and the timer 118. The processor 114 writes data to and reads data from the memory 116. In an embodiment, the memory 116 stores the values of the dynamic range, the AE metadata, the motion level, the first threshold value, the second threshold value, and the third threshold value. The timer 118 is used to set the specified time period which can be stored in the memory 116.

Therefore, in accordance with the embodiments of the present disclosure, the HDR mode is invoked based on the values of the dynamic range, AE metadata, and the motion level.

It is to be understood that FIG. 1 is for illustrative purposes only and is not intended to be a complete schematic diagram of the various components and connections therebetween required for a camera. Therefore, a camera may comprise various other components not shown in FIG. 1, or may have various other configurations internal and external, and still be within the scope of the present disclosure. Also, one or more of these components may be combined or integrated in a common component, or component features may be distributed among multiple components. Also, the components of the camera 100 can be connected differently without departing from the scope of the present disclosure.

Figure 2:
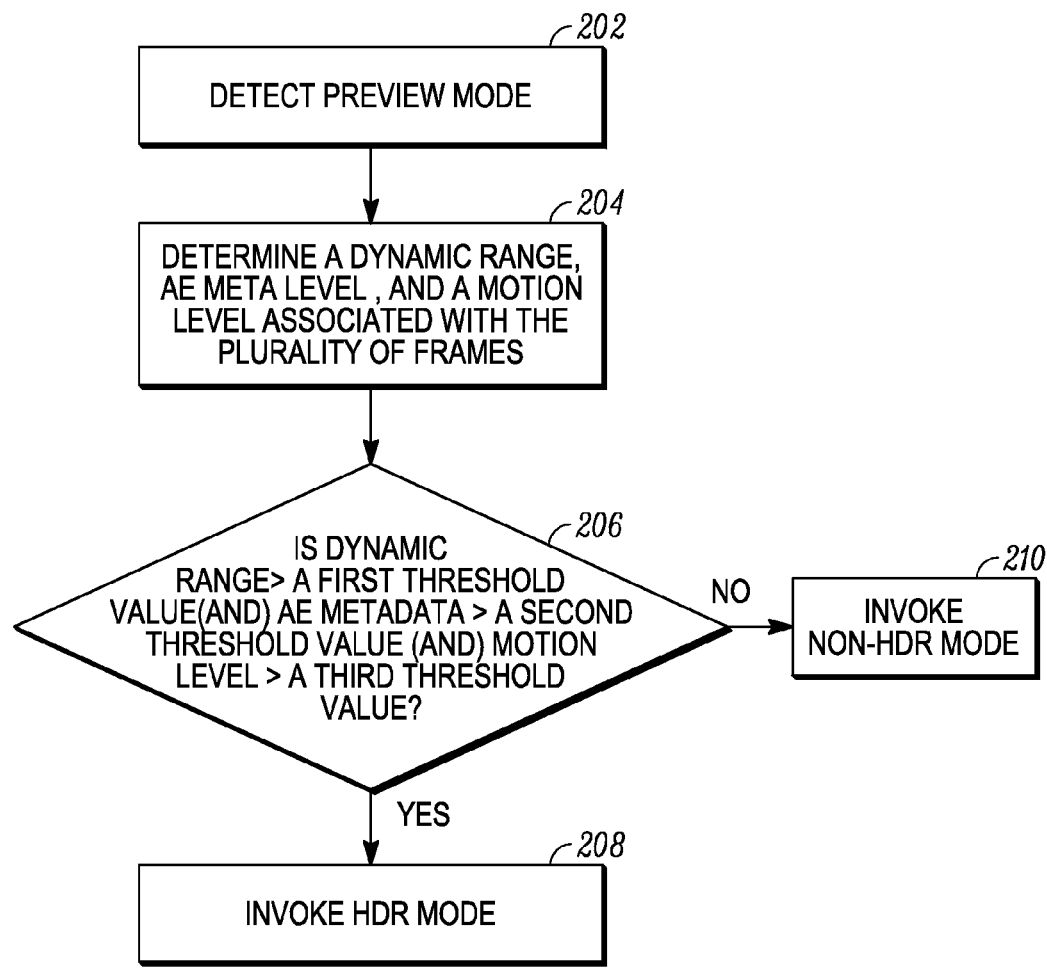
FIG. 2 is a flowchart of a representative method for invoking an HDR mode in the camera.

With this general background in mind, turn to FIG. 2 which presents a representative method for invoking an HDR mode in a camera. The process 200 may be carried out by one or more suitably programmed controllers or processors executing software (e.g., the processing circuitry 112 of FIG. 1). The process 200 may also be embodied in hardware or a combination of hardware and software according to the possibilities described above. Although the process 200 is described with reference to the flowchart illustrated in FIG. 2, it will be appreciated that many other methods of performing the acts associated with process 200 may be used. For example, the order of many of the operations may be changed, and some of the operations described may be optional.

The example process 200 begins at step 202 when the image sensor 102 in the camera 100 detects the preview mode. In one embodiment, detecting the preview mode comprises receiving a plurality of frames associated with the preview mode. In other words, the image sensor 102 receives the frames associated with the current preview of the scene or the image captured during the preview mode.

The method 200 then determines 204 a dynamic range, AE metadata, and a motion level associated with the plurality of frames. In one embodiment, the dynamic range and the AE metadata are measured for each frame of the plurality of frames captured. In accordance with the embodiment, the dynamic range, the AE metadata, and the motion level are constantly generated as preview frames are captured by the image sensor 102.

The method 200 then determines 206 if each of the dynamic range, the AE metadata, and the motion level is above a first threshold value, a second threshold value, and a third threshold value, respectively. If it is determined that each of the dynamic range, the AE metadata, and the motion level is above the first threshold value, the second threshold value, and the third threshold value, respectively, then the HDR mode is invoked. However, if at least one of the dynamic range, the AE metadata, and the motion level is below the first threshold, second threshold, or third threshold, respectively, then the method 200 invokes 210 the non-HDR mode. In accordance with another embodiment, the HDR mode is invoked when at least one of the dynamic range and the AE metadata is above the first threshold or the second threshold, respectively, and the motion level is above the third threshold. In other words, it is possible for one of the dynamic range or the motion level to be below the first threshold or the second threshold, respectively, and still invoke the HDR mode.

Therefore, in accordance with the embodiments, the decision to invoke the HDR mode is based on accessing the three input signals generated by the dynamic-range analysis unit 106, the AE-metadata analysis unit 108, and the motion-level analysis unit 110. Further, the three input signals are combined such that an accurate decision can be made as to whether to invoke the HDR mode.

Figure 3:
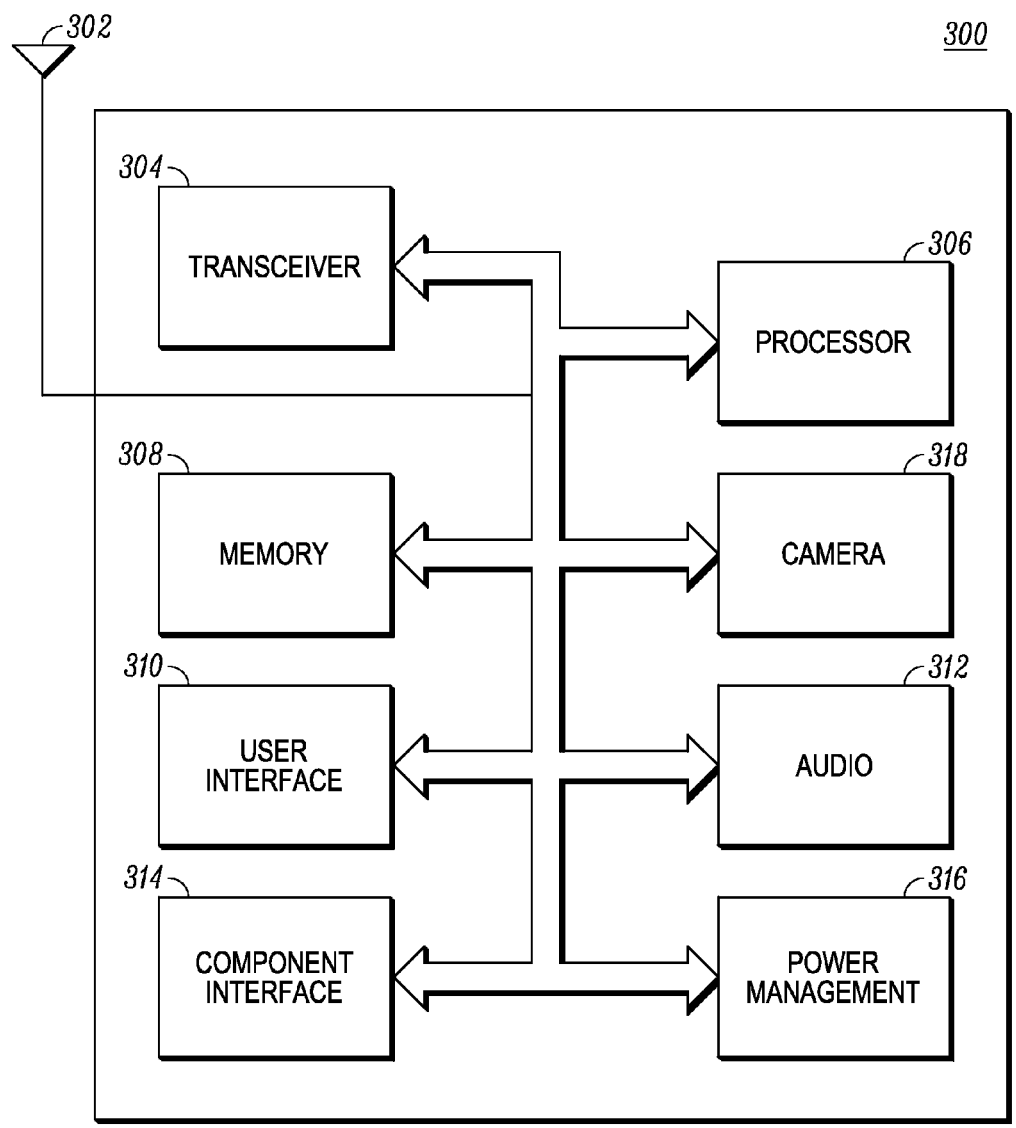
FIG. 3 is a block diagram representation of an electronic device in accordance with some embodiments of the present invention

FIG. 3 illustrates an electronic device 300 that can be used with the camera 100 of the present techniques. The electronic device 300 is meant to represent any computing device that presents visual information. It could be, for example, a personal communications device with a display screen, a mobile telephone, a personal digital assistant, a digital camera, or a personal or tablet computer. Also, the camera 100 could be a part of the electronic device 300 or could be connected separately to the electronic device 300. In some embodiments, the electronic device 300 presents visual information to be displayed on a screen separate from the device 300 itself, such as a set-top box, gaming console, or server. The device 300 could even be a plurality of servers working together in a coordinated fashion.

The electronic device 300 includes a transceiver 304 configured for sending and receiving data. The transceiver 304 is linked to one or more antennas 302. The electronic device 300 also includes a processor 306 that executes stored programs. The processor 306 may be implemented as any programmed processor and may be configured to operate with the different antennas and transceivers for the different 3G networks or other networks. However, the functionality described herein may also be implemented on a general-purpose or a special-purpose computer, a programmed microprocessor or microcontroller, peripheral-integrated circuit elements, an application-specific integrated circuit or other integrated circuits, hardware logic circuits, such as a discrete element circuit, a programmable logic device such as a programmable logic array, field programmable gate-array, or the like.

The electronic device 300 further includes a memory 308. The processor 306 writes data to and reads data from the memory 308. The electronic device 300 includes a user-input interface 310 that may include one or more of a keypad, display screen, touch screen, and the like. The electronic device 300 also includes an audio interface 312 that includes a microphone and a speaker. The electronic device 300 also includes a component interface 314 to which additional elements may be attached. Possible additional elements include a universal serial bus interface. The electronic device 300 includes a power-management module 316. The power-management module 316, under the control of the processor 306, controls the amount of power used by the transceiver 304 to transmit signals. Finally, the electronic device 300 also includes a camera 318 (for example, camera 100 of FIG. 1) to capture images. The camera 318 may be included as a part of the electronic device 300 or be connected separately to the electronic device 300.

In an embodiment, the user interface 310 includes a display screen, such as a touch-sensitive display that displays, to the user, the output of various application programs executed by the processor 306. The user interface 310 additionally includes on-screen buttons that the user can press in order to cause the electronic device 300 to respond. The content shown on the user interface 310 is generally provided to the user interface at the direction of the processor 306. Similarly, information received through the user interface 310 is provided to the processor 306, which may then cause the electronic device 300 to carry out a function whose effects may or may not necessarily be apparent to a user.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method for invoking a high dynamic range ("HDR") mode in a camera, the method comprising:
    detecting that the camera is operating in a preview mode;
    determining a dynamic range, auto exposure ("AE") metadata, and a motion level associated with a plurality of frames captured in the preview mode, the determining of at least one of the dynamic range, the AE metadata, or the motion level by measuring the dynamic range, the AE metadata, or the motion level, respectively, of the plurality of frames captured in the preview mode;
    determining, based on the measuring, a stability value of at least one of the dynamic range, the AE metadata, or the motion level; and
    invoking the HDR mode when each of the determined dynamic range, the AE metadata, and the motion level is above a first threshold value, a second threshold value, and a third threshold value, respectively.

2. The method of claim 1 wherein detecting that the camera is operating in a preview mode comprises:
    receiving the plurality of frames.

3. The method of claim 1 wherein the determining the stability value of the dynamic range, the AE metadata, or the motion level determines the stability value of the dynamic range.

4. The method of claim 3 wherein the determining the stability value of the dynamic range predicts a future stability of the measured dynamic range.

5. The method of claim 1 wherein determining AE metadata comprises measuring the AE metadata associated with each frame of the plurality of frames captured in the preview mode.

6. The method of claim 5 further comprising:
    wherein the determining the stability value of the dynamic range, the AE metadata, or the motion level determines the stability value of the AE metadata, the stability value predicting the future stability of the determined AE metadata.

7. The method of claim 1 further comprising invoking a non-HDR mode when at least one of the determined dynamic range, the AE metadata, and the motion level is below the first threshold value, the second threshold value, and the third threshold value, respectively.

8. An apparatus for invoking a high dynamic range ("HDR") mode, the apparatus comprising:
    an image sensor configured to detect that the apparatus is in a preview mode;

an image-processing engine configured to determine a dynamic range, auto-exposure ("AE") metadata, and a motion level associated with a plurality of frames captured in the preview mode;

a filter configured to:
- determine, based on the measured dynamic range, a stability value of the dynamic range for the plurality of frames captured in a specified time period, the stability value predicting a future stability of the measured dynamic range;
- determine, based on the measured AE metadata, a stability value of the AE metadata for the plurality of frames captured in a specified time period, the stability value predicting a future stability of the measured AE metadata; or
- determine, based on the determined motion level, a stability value of the motion level for the plurality of frames captured in a specified time period, the stability value predicting a future stability of the measured motion level; and processing circuitry configured to invoke the HDR mode when each of the determined dynamic range, the AE metadata, and the motion level is above a first threshold value, a second threshold value, and a third threshold value, respectively.

9. The apparatus of claim 8 wherein the image sensor is configured to receive the plurality of frames in the preview mode.

10. The apparatus of claim 8 wherein the image-processing engine is configured to determine a dynamic range by measuring the dynamic range associated with each frame of the plurality of frames captured in the preview mode.

11. The apparatus of claim 10 wherein the filter is configured to determine the stability value of the dynamic range.

12. The apparatus of claim 8 wherein the image-processing engine is configured to determine AE metadata by measuring the AE metadata associated with each frame of the plurality of frames captured in the preview mode.

13. The apparatus of claim 12 wherein the filter is configured to determine the stability value of the AE metadata.

14. The apparatus of claim 8 wherein the filter is configured to determine the stability value of the motion level.

15. The apparatus of claim 8 wherein the processing circuitry further invokes a non-HDR mode when at least one of the determined dynamic range, the AE metadata, and the motion level is below the first threshold value, the second threshold value, and the third threshold value, respectively.

16. The apparatus of claim 8 further comprising:
a memory configured to store the determined dynamic range, the AE metadata, and the motion level.

* * * * *